Feb. 3, 1970  K. E. MARSTELLER  3,492,833
AIR CONDITIONING

Filed May 22, 1968  2 Sheets-Sheet 1

INVENTOR.
KENNETH E. MARSTELLER
BY
Harry W. Hargis III
AGENT

Feb. 3, 1970     K. E. MARSTELLER     3,492,833
AIR CONDITIONING

Filed May 22, 1968                                  2 Sheets-Sheet 2

INVENTOR.
KENNETH E. MARSTELLER
BY

Harry W. Hargis III
AGENT

United States Patent Office 3,492,833
Patented Feb. 3, 1970

3,492,833
AIR CONDITIONING
Kenneth E. Marsteller, Willow Grove, Pa., assignor to Philco-Ford Corporation, Philadelphia, Pa., a corporation of Delaware
Filed May 22, 1968, Ser. No. 731,054
Int. Cl. F25d 17/04; F24f 1/02
U.S. Cl. 62—176
6 Claims

ABSTRACT OF THE DISCLOSURE

An air conditioner temperature control having a single, "dry bulb" thermostat that effects thermostatic control of the air conditioner compressor as a function of both temperature and humidity. The thermostat's sensing element is disposed in such heat exchange relation with a thermal conductor disposed in the stream of air undergoing control that the heat transferred by the conductor between the stream of air and the sensing element is a function of the moisture content of the stream of air. Operation afforded by the control is such that when the relative humidity is high, the air conditioner operates to maintain a lower dry bulb temperature than when relative humidity is low. Conversely, when the relative humidity is low, the air conditioner operates to maintain a higher dry bulb temperature than when the relative humidity is high.

BACKGROUND OF THE INVENTION

This invention relates to air conditioning, and more particularly to improvements in control means for air conditioning apparatus.

While of broader applicability, the present invention has particular utility in the field of single-room air conditioners. Such air conditioners generally are controlled by thermostats responsive only to the dry bulb temperature of the room air. Accordingly, the range of relative humidity may vary considerably during a cooling cycle. As is well known in the art, occupants of a rom will feel comfortable only so long as the combination of relative humidity and dry bulb temperature of the room air results in an effective temperature falling within the so-called "comfort-zone."

It is a general objective of this invention to provide simple and inexpensive air conditioner control means operable in response to effective temperatures, rather than only dry bulb temperatures, whereby air being conditioned will be maintained within the comfort zone.

SUMMARY OF THE INVENTION

In achievement of the foregoing as well as other objectives, the invention contemplates—particularly in an air conditioner—the combination of a thermostat including a sensing element, means for moving air, a thermal conductor positioned in heat exchange relation with both the sensing element and the air as it is caused to move, and means responsive to changes in the relative humidity of the air for varying heat transferred by the conductor from the air to the sensing element.

Advantageously, the invention involves simple but novel modification of thermostatic sensing element of well known type whereby an air conditioner can be made to achieve and maintain effective temperatures within the comfort zone.

The foregoing as well as other objectives and advantages of the invention will be more fully understood from a consideration of the following description, taken in light of the accompanying drawing.

DESCRIPTION OF THE PREFERRED EMBODIMENT

Figure 1:
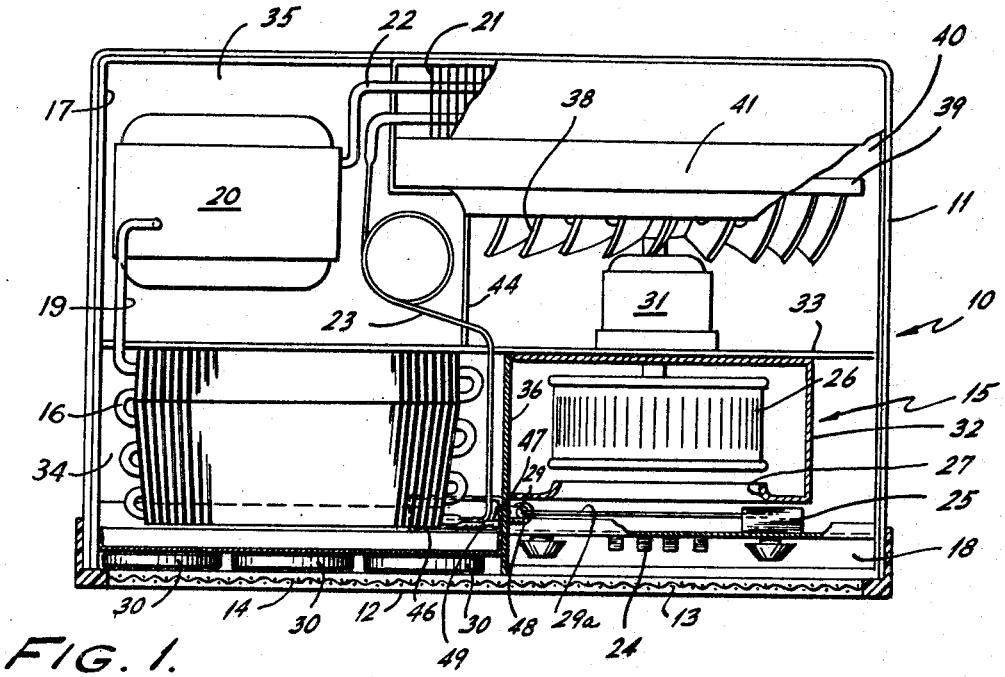
FIGURE 1 is a plan view, with parts removed and other parts broken away, of air conditioning apparatus embodying the present invention.
Figure 2:
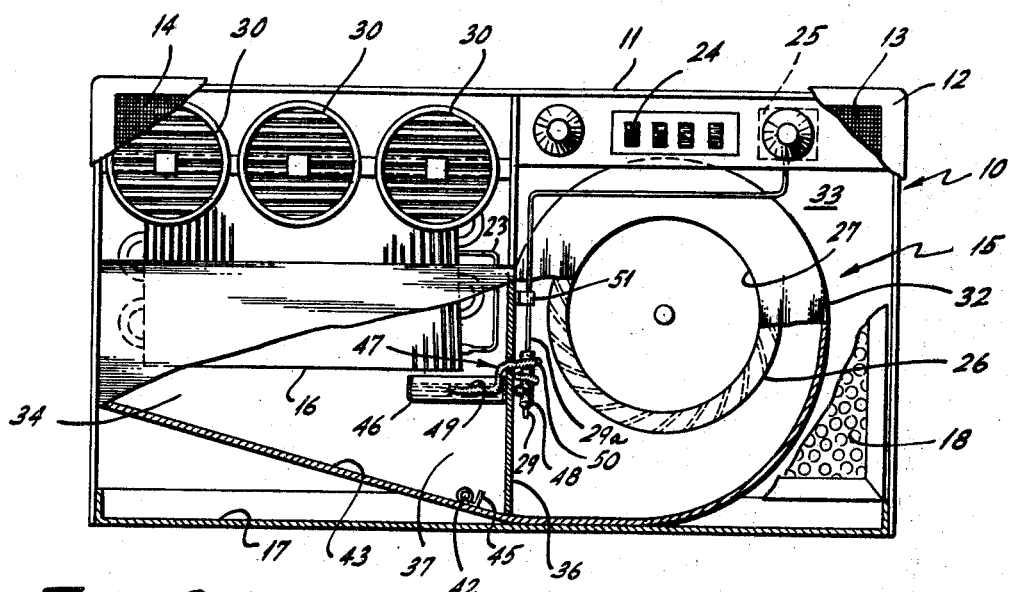
FIGURE 2 is a front elevational showing, partly in section and with parts broken away, of apparatus seen in FIGURE 1.

With more detailed reference to the drawing, and first to FIGURES 1 and 2, the control apparatus of the invention is shown as embodied in a window-mounted air conditioner 10 including a cabinet or housing 11, preferably but not necessarily rectangular in configuration, having a base portion 17 and a conventional decorative panel 12. The latter has room air inlet and outlet passage means for the air moving means to be described more fully in what follows. The inlet includes grille 13 and a filter 18 disposed in the right hand region of panel 12 and in air flow communication with the inlet opening 27 of indoor blower portion 26 of air moving means 15. The aforesaid outlet air passage means includes grille 14 disposed in air flow communication with an evaporator coil 16, hereinafter also referred to as the indoor coil. A plurality of independently rotatable louvers 30 are disposed between the evaporator coil 16 and outlet grille 14 and conveniently provide selectivity of the direction of discharge air flow. Evaporator coil 16, preferably of the finned type, is part of the usual refrigerating system, shown diagrammatically in FIGURE 3 and including a motor compressor 20, condenser or outdoor coil 21, and associated conduits through which said motor compressor, condenser and evaporator coils are coupled in series refrigerant flow circuit. These conduits include a line 22 through which refrigerant normally is delivered to outdoor coil 21, and a feed line 23 which, as shown, may advantageously comprise a continuously open restrictive connection through which liquified refrigerant is normally fed to the indoor coil 16 for expansion therein. Refrigerant is withdrawn by the compressor from the evaporator through suction line 19 to complete the refrigerant flow circuit. The compressor is selectively energized through lines $L_1$ and $L_2$ having in series therewith line control switch means 24 (see also FIGURE 2) and the switch 28 of a bellows-actuated thermostat 25 having a sensing bulb 29. In particular accordance with the invention, the bulb is arranged in a novel manner described below.

Referring again to air moving means 15, a motor 31 is connected to lines $L_1$ and $L_2$ (FIGURE 3), in series electrical circuit with line switch 24, and rotatably supports the blower 26 adapted to circulate air in heat exchange relation with evaporator coil 16. Blower 26 is housed within a scroll structure 32 disposed adjacent a partition 33 which divides cabinet 11 into an evaporator coil chamber 34 and a condensing coil chamber 35. The portion of cabinet 11 comprising chamber 34 is adapted to extend into a room or space to be air conditioned while chamber 35 of the cabinet, lying to the other side of partition 33, extends outwardly of the room, preferably through a window opening thereof. The evaporator coil chamber 34 is subdivided by means of a partition 36, into a section having disposed therein the blower and scroll assembly 26, 32 and a section in which is disposed evaporator coil 16. The mouth portion 37 of the scroll 32 extends through partition 36 and into position to direct air against one face of evaporator coil 16.

Condensing coil chamber 35 also has disposed therein motor compressor 20 and fan motor 31. A propeller type fan 38 is rotatably supported within chamber 35 by motor 31 to provide for drawing outside air into the chamber over the outdoor coil 21, and for discharging the spent air outwardly from the chamber over motor compressor 20.

The fan 38 includes a conventional condensate ring 39 which dips into a condensate sump 40 and causes condensate in the sump to be thrown onto baffle means 41 arranged to direct the condensate onto outdoor coil 21 for evaporation therefrom in the course of the refrigerating cycle. Condensate formed on the indoor coil drips onto a baffle 43 and flows through an opening 42 connected to a tube 44 terminating at sump 40. The evaporator coil element 16 is generally planar in configuration and is positioned to slope in such manner that condensate dripping therefrom falls substantially across the entire area of the evaporator and upon sloping baffle 43.

In especial accordance with the invention, a pan 46 conveniently supported from partition 36 is disposed below a portion of evaporator coil 16 to intercept and store a portion of the evaporator coil 16 to intercept store a portion of the condensate dripping therefrom. A wick 47 extends through a suitable opening (FIGURE 2) in partition 36. One end 49 of the wick extends into pan 46 for immersion in the condensate, and the other end 50 is coiled about a section of rubber tubing 48. Sensing bulb 29 extends into the bore of tubing 48, in close thermal engagement therewith and is held in position by suitable clamping means 51 conveniently supported from the partition 36.

By such arrangement, both the sensing bulb 29 and its non-sensing portion 29a will be subjected to the flow of room air as it is drawn through grille 13, filter 18, and the inlet 27 of blower 26. The section of rubber tubing 48 is characteristically of material affording a path of limited thermal conductivity between the sensing bulb 29 and the coiled wick portion 50. There is also a heat path between sensing bulb 29 and its non-sensing portion 29a. The sensing bulb 29 is subjected to dry bulb temperature by virtue of the above described disposition of portion 29a, and to wet bulb temperature by virtue of the wick portion 50 disposed about tubing 48 through which the bulb extends. In operation, the bulb portion 29a absorbs heat from the moving air, and serves as a conductor for transferring this heat to the relatively cold sensing bulb 29. Cooling of bulb 29 is ensured by the thermal path between it and wick portion 50, and the degree of such cooling is dependent upon the rate of evaporation from the wick as a function of the percent relative humidity thus, for a given dry bulb temperature the motor-compressor will be caused to operate a greater percentage of time when the relative humidity is higher than when it is lower. The net effect is thermostatic control of the air conditioner in a range representative of an effective temperature. By suitably balancing the thermal effects of wet and dry bulb temperatures, operation can be established and maintained so that the effective temperature falls within the comfort zone.

Figure 4:
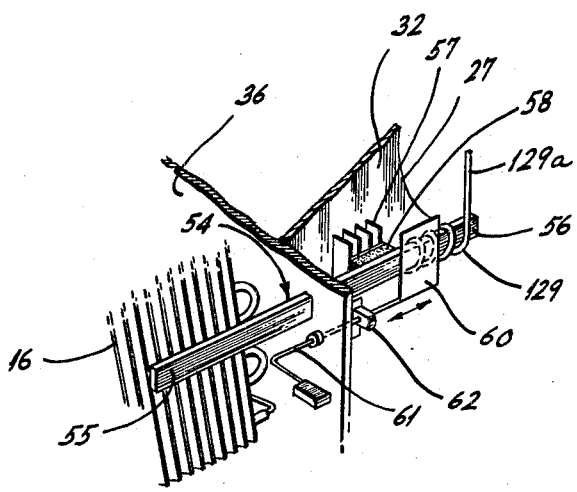
FIGURE 4 is a fragmentary showing of a portion of apparatus as seen in FIGURE 2, including another form of the invention.

A modification of the invention is seen in FIGURE 4, wherein the sensing portion 129 of a control bulb 129a, similar to the described bulb, is coiled about a thermally conductive member 54 extending through partition 36. One end portion 55 of member 54 is disposed in the stream of air after its flow over evaporator coil 16, and the other end portion 56 is disposed in the stream of air prior to its flow over the evaporator coil. A set of heat exchange fins 57 are thermally coupled with the end portion 56 by means of a body 58 of hygroscopic material, such for example as activated alumina, also exposed to the stream of air prior to its flow over the evaporator. Thus, the end portion 55 is "cold-biased" by virtue of its disposition downstream of evaporator coil 16, and the conduction path to control bulb 129, by way of end portion 56, is in effect "short circuited" by the body of hygroscopic material 58 whose thermal conductivity is a function of the moisture content of air flowing thereover. The thermal conductivity of body 58 increases with increasing relative humidity, whereby flow of heat into the bulb 129 will be greater for such increased relative humidity. Conversely, thermal conductivity of body 58 decreases with decreasing relative humidity, whereby flow of heat into bulb 129 from the incoming air will be less for decreased relative humidity. By such arrangement, and for a given dry bulb temperature, the motor compressor will be caused to operate a greater percentage of time when the relative humidity is higher than when the relative humidity is lower. By suitably balancing the thermostat's cycling characteristics with the capacity of refrigerating unit, temperatures can be maintained within the comfort zone.

With further reference to FIGURE 4, the air conditioner is enabled to achieve an environment corresponding to a particular region of the comfort zone by regulating the relative influences of the dry bulb and the wet bulb temperatures. Regulation is achieved by means of an air shield 60 that may be selectively positioned to govern the amount of air flowing over control bulb sensing element 129. One arrangement for doing this comprises supporting shield 60 on a rod 61 that is longitudinally slidable through an opening in partition 36 and within a bracket 62. Movement of the shield may be achieved either manually, or by suitable linkage means, whereby the desired regulation may be achieved.

Advantageously, the described balancing arrangement achieves a more precise establishment and maintenance of a desired effective temperature. This will be more fully appreciated when it is realized that even though the effective temperature may be maintained within the comfort zone, complete subjective comfort is not necessarily achieved. The effective temperature range which embraces the comfort zone is a compromise, since such zone contemplates the comfort of most of the subjects, for example about 90%. The additional control afforded by apparatus illustrated in FIGURE 4 affords adjustment of the effective temperature range within the comfort zone in order to satisfy the needs of the remaining 10% of the subjects.

While only those operational elements necessary for an understanding of the invention have been disclosed, it will be appreciated that other conventional features may be included.

For example, the fan motor may be of the multispeed type to afford varying degrees of air circulation. Also, dampers may be provided for mixing outside air with indoor air, as may be desired by the user.

I claim:

1. In combination, a thermostat including a sensing element, means for moving air over said sensing element, means for controlling the dry bulb and wet bulb temperatures of such air in accordance with temperatures sensed by said sensing element, said sensing element including a portion subjected to the dry bulb temperature of air flowing thereover and a portion subjected to the wet bulb temperature of air flowing thereover, and means for selectively balancing the effects of such dry and wet bulb temperatures on said sensing element.

2. In air conditioning apparatus of the type including a cooling coil and means for moving air over said cooling coil; a thermostat operable to control energization of said cooling coil and including a sensing element; a thermal conductor positioned in heat exchange relation with said sensing element, and further including portions positioned both upstream and downstream of said cooling coil for heat exchange relation with air caused to flow over the latter; and means for providing variable thermal coupling between said conductor and the moving air, said last recited means being effective to vary the thermal coupling in accordance with changes in relative humidity of the moving air.

3. Apparatus according to claim 2, and characterized in that said means for providing variable thermal coupling comprises a body of hygroscopic material, whereby the quantity of heat transferred is a function of the moisture content of said material as absorbed from the moving air.

4. In air conditioning apparatus of the type including a refrigerant evaporator, a refrigerant condensing unit for said evaporator, means for circulating air to be conditioned over said evaporator, and a thermostat for controlling cyclic energization and deenergization of said condensing unit, said thermostat including a sensing element disposed in the stream of circulating air, the improvement comprising means responsive to changes in the relative humidity of the circulating air to vary the heat transferred between such air and said sensing element, said means including a body of thermally conductive material extending from a region downstream of said cooling coil to a region upstream thereof, into thermal exchange relation with said sensing element, and means including a hygroscopic material thermally coupling air upstream of said evaporator with said sensing element, the thermal coupling afforded by the recited material being a function of the moisture content of the circulating air.

5. In apparatus of the type set out in claim 4, and further characterized by the inclusion of movable shield means selectively positionable to vary the quantity of air flowing over said sensing element.

6. In combination, a thermostat including a sensing element, means for moving air over said sensing element, means for controlling the temperature and relative humidity of such air in accordance with temperatures sensed by said sensing element, means responsive to changes in relative humidity of said air for varying the heat transferred between said air and said sensing element, and means for modifying the quantity of air flow over said sensing element.

References Cited

UNITED STATES PATENTS

| | | | |
|---|---|---|---|
| 2,130,092 | 9/1938 | Kettering | 62—176 |
| 2,227,686 | 1/1941 | Wittmann | 236—44 |
| 2,279,535 | 4/1942 | Stickel | 62—176 |
| 2,485,894 | 10/1949 | Kuhn | 62—176 |
| 2,982,110 | 5/1961 | Kramer | 62—176 |

FOREIGN PATENTS 230,070  12/1959  Canada.

WILLIAM J. WYE, Primary Examiner

U.S. Cl. X.R.

62—209, 262; 165—21; 136—44

PO-1050
(5/69)

UNITED STATES PATENT OFFICE
CERTIFICATE OF CORRECTION

Patent No. 3,492,833        Dated February 3, 1970

Inventor(s) KENNETH E. MARSTELLER

It is certified that error appears in the above-identified patent and that said Letters Patent are hereby corrected as shown below:

Column 1, line 43, "rom" should read -- room -- .

Column 3, line 27, "store a portion of the evaporator coil 16 to intercept" should be deleted.

Column 3, line 56, a period (.) should appear after "humidity and "thus" should read -- Thus -- .

Figure 3:
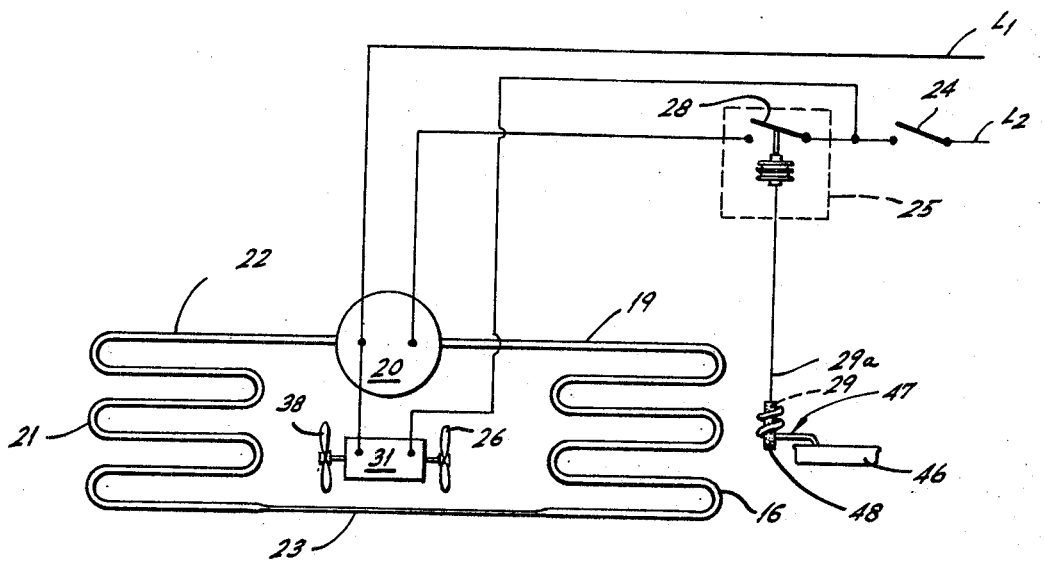
FIGURE 3 is a diagrammatic view illustrating a refrigerant flow circuit, and control means therefor embodying the invention.

In the drawings, Sheet 2, Figure 3, the open contact of switch 28 of thermostat 25 should be moved from its illustrated position to a position above the switch 28, as shown in the following sketch.

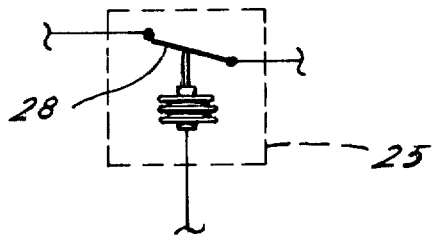

SIGNED AND
SEALED

SEAL)
Attest:

Edward M. Fletcher, Jr.
Attesting Officer

WILLIAM E. SCHUYLER, JR.
Commissioner of Patents